United States Patent
Jallouli et al.

(10) Patent No.: US 12,544,998 B2
(45) Date of Patent: Feb. 10, 2026

(54) OPTICAL MICROSTRUCTURE-CONTAINING LAMINATE FOR OPHTHALMIC LENS INCORPORATION

(71) Applicant: Essilor International, Charenton-le-Pont (FR)

(72) Inventors: Aref Jallouli, Dallas, TX (US); Zbigniew Tokarski, Dallas, TX (US); Hao-Wen Chiu, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 356 days.

(21) Appl. No.: 17/918,220

(22) PCT Filed: Apr. 13, 2021

(86) PCT No.: PCT/EP2021/059571
§ 371 (c)(1),
(2) Date: Oct. 11, 2022

(87) PCT Pub. No.: WO2021/209453
PCT Pub. Date: Oct. 21, 2021

(65) Prior Publication Data
US 2023/0148025 A1 May 11, 2023

(30) Foreign Application Priority Data
Apr. 14, 2020 (EP) .................................... 20315168

(51) Int. Cl.
*B29D 11/00* (2006.01)
(52) U.S. Cl.
CPC .... *B29D 11/00326* (2013.01); *G02C 2202/16* (2013.01)

(58) Field of Classification Search
CPC ........ B29D 11/00326; B29D 11/00355; B29D 11/00365; B29D 11/00009;
(Continued)

(56) References Cited

U.S. PATENT DOCUMENTS

| 8,482,857 B2 | 7/2013 | Wolterink et al. |
| 10,386,654 B2 | 8/2019 | Marshall et al. |

(Continued)

FOREIGN PATENT DOCUMENTS

| EP | 1887414 | 2/2008 |
| EP | 3220190 | 9/2017 |

(Continued)

OTHER PUBLICATIONS

International Search Report and Written Opinion issued in Corresponding PCT Application No. PCT/EP2021/059571, dated May 11, 2021.

(Continued)

*Primary Examiner* — Xiao S Zhao
*Assistant Examiner* — Inja Song
(74) *Attorney, Agent, or Firm* — Norton Rose Fulbright US LLP

(57) ABSTRACT

The present disclosure relates to a laminate, comprising a first film including a pattern of microstructures embossed on a first surface of thereof, each microstructure being arranged at a predetermined distance between adjacent microstructures, and a second film including structures arranged on a first surface thereof at positions corresponding to areas of the first surface of the first film defined by the predetermined distance, wherein when the second film is laminated to the first film, the structures arranged on the first surface of the second film are in contact with the areas of the first surface of the first film defined by the predetermined distance, a height of the structures is greater than a height of each (Continued)

microstructure, and a delta defined therebetween encapsulates a void fill material in at least a portion of at least one void defined by the delta.

13 Claims, 11 Drawing Sheets

(58) Field of Classification Search
CPC .......... B29D 11/00317; B29D 11/0073; G02C 2202/16; G02C 7/022; G02C 2202/24
See application file for complete search history.

(56) References Cited

U.S. PATENT DOCUMENTS

| | | |
|---|---|---|
| 2006/0006336 A1 | 1/2006 | Cano et al. |
| 2008/0030675 A1 | 2/2008 | Dillon |
| 2008/0212193 A1 | 9/2008 | Steenblik et al. |
| 2009/0153970 A1 | 6/2009 | Lee et al. |
| 2010/0177380 A1 | 7/2010 | Nagahama et al. |
| 2012/0057100 A1* | 3/2012 | Masuda ................. G02B 5/045 359/619 |
| 2013/0052294 A1 | 2/2013 | Wang et al. |
| 2014/0087140 A1* | 3/2014 | Benson ............... B29C 35/0866 428/156 |
| 2015/0251480 A1 | 9/2015 | Souparis et al. |
| 2016/0003992 A1 | 1/2016 | Nagahama et al. |
| 2016/0306192 A1* | 10/2016 | Marshall ............ G02B 3/0043 |
| 2017/0131567 A1 | 5/2017 | To et al. |
| 2017/0299898 A1 | 10/2017 | Gallina et al. |
| 2017/0368569 A9 | 12/2017 | Wolk et al. |
| 2020/0073147 A1* | 3/2020 | Bakaraju ................. G02C 7/022 |
| 2022/0357595 A1* | 11/2022 | Guillot .................. G02C 7/022 |
| 2023/0148025 A1 | 5/2023 | Jallouli et al. |

FOREIGN PATENT DOCUMENTS

| | | |
|---|---|---|
| WO | WO 2010/135213 | 11/2010 |
| WO | WO 2012/067761 | 5/2012 |
| WO | WO 2016/168746 | 10/2016 |
| WO | WO 2018/076057 | 5/2018 |
| WO | WO 2021/090207 | 5/2021 |

OTHER PUBLICATIONS

International Search Report and Written Opinion issued in Corresponding PCT Application No. PCT/EP2021/059569, dated Jul. 2, 2021.
International Search Report and Written Opinion issued in Corresponding PCT Application No. PCT/EP2021/059582, dated May 12, 2021.
"All You Should Know About Thermoplastic Materials", pp. 1-3, 2019, [online], [retrieved Apr. 2, 2025], retrieved from the Internet <URL: https://protoplastics.com/about-thermoplastic-materials/>.
"High-performance Micro-optic Components", pp. 1-4, 2017, [online], [retrieved Apr. 1, 2025], retrieved from the Internet URL:https://www.teledyne-si.com/en-us/Products-and_Services_/Documents/Optical%20Microlenses/2017/Microlens-Brochure-3%20FINAL.pdf.
"Refractive Index for Some Common Liquids, Solids and Gases", pp. 1-5, 2017, [online], [retrieved Apr. 2, 2025], retrieved from the Internet <URL: https://web.archive.org/web/20170609085907/https://www.engineeringtoolbox.com/refracive-index-d_1264.html>.
Jacques et al., "Micro Lens Array Assembly for Optical Organic Substrate", 2019 *IEEE 69th Electronic Components and Technology Conference (ECTC)*, pp. 1074-1080, 2019.

* cited by examiner

OPTICAL MICROSTRUCTURE-CONTAINING LAMINATE FOR OPHTHALMIC LENS INCORPORATION

CROSS-REFERENCE TO RELATED APPLICATIONS

This application is a national phase application under 35 U.S.C. § 371 of International Application No. PCT/EP2021/059571 filed 13 Apr. 2021, which claims priority to European Patent Application No. 20315168.3 filed 14 Apr. 2020. The entire contents of each of the above-referenced disclosures is specifically incorporated by reference herein without disclaimer.

BACKGROUND

Field of the Disclosure

The present disclosure relates to a laminate, comprising optical microstructures that allow for universal application to ophthalmic lenses for correction of aberrant vision.

Description of the Related Art

Myopia, also known as near-sightedness and short-sightedness, is a condition of the eye where the light that enters the eye is not focused directly on the retina. Instead, the light that enters the eye is focused in front of the retina, causing the image that the individual observes to be in or out of focus depending on a distance of an object from the eye of the individual. For instance, when an object is a distant object, the observed object will be out of focus while, when the object is a near object, the observed object will be in focus.

Though correctable by refractive surgery, myopia is most commonly corrected through the use of corrective lenses, such as glasses or contact lenses. The corrective lenses have a negative optical power (i.e., have a net concave effect), which compensates for the excessive positive diopters of the myopic eye. Negative diopters are generally used to describe a severity of a myopic condition, as this is the value of the lens to correct the vision.

Recently, efforts in addressing the progression of myopia in children and young adults have included providing optical microstructures directly on surfaces of corrective lenses. The optical microstructures may be microlenses, for instance, that redirect part of the incoming light to the retina. The use of microlenses on the surface of a regular single vision lens to introduce peripheral defocus has been shown to be very effective in slowing the progression of myopia.

To now, however, optical microstructures have been incorporated directly on surfaces of the corrective lenses. The optical microstructures may be engraved, etched, or embossed directly on either a convex surface of the corrective lens (e.g. a lens surface opposite to a lens surface adjacent to an eye of a wearer) or a concave surface of the corrective lens (e.g. a lens surface adjacent to an eye of a wearer). In one instance, this arrangement may lead to scratching or other damage to the optical microstructures as a result of everyday use. Moreover, by creating the optical microstructures directly on a lens surface of the corrective lenses, a unique design may be needed for each lens substrate material as each optical microstructure design is dependent on a change in refractive index between the optical microstructure and a surrounding medium, every lens substrate material requiring a unique set of optical designs. In this way, each lens substrate material may require a unique optical microstructure architecture and arrangement. It can be appreciated that such an approach becomes impracticable at scale and demands a more generally-applicable solution.

According to an embodiment, the present disclosure provides a solution that allows a limited number of optical microstructure designs to be used with any given material and on a variety of lens substrate materials.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

According to the claims, the present disclosure relates to a laminate and a method of generating a laminate for prevention of myopia progression.

According to an embodiment, the present disclosure further relates to a laminate, comprising a first film, of a first material having a first refractive index, including a pattern of microstructures embossed on a first surface of the first film, each microstructure of the embossed pattern of microstructures being an optical microstructure arranged at a predetermined distance between adjacent optical microstructures, and a second film, of a second material having a second refractive index, including structures arranged on a first surface of the second film at positions corresponding to areas of the first surface of the first film defined by the predetermined distance between adjacent optical microstructures, wherein when the second film is laminated to the first film, the structures arranged on the first surface of the second film are in contact with the areas of the first surface of the first film defined by the predetermined distance between adjacent optical microstructures, a height of the structures of the second film is greater than a height of each optical microstructure, and a delta between the height of the structures of the second film and the height of each optical microstructure encapsulates, upon the lamination of the second film to the first film, a void fill material within at least a portion of at least one void defined by the delta, the void fill material having a predetermined refractive index.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
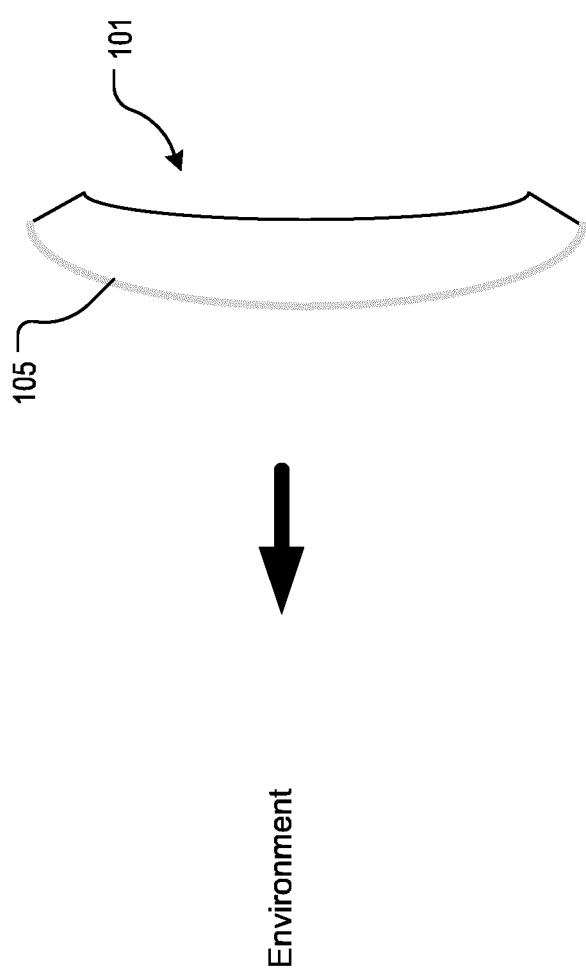
FIG. 1 is an illustration of a lens having optical microstructures directly on a surface thereof.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "wafer" and "laminate" may be used interchangeably to refer to a similar structure.

The terms "about" and "approximately" are defined as being close to as understood by one of ordinary skill in the art. In one non-limiting embodiment the terms are defined to be within 10%, preferably, within 5%, more preferably, within 1%, and most preferably, within 0.5%.

According to an embodiment, the present disclosure provides a solution that allows a limited number of optical microstructure designs to be used with any given material and on a variety of lens substrate materials. In effect, the present disclosure describes a laminate containing optical microstructures that may be broadly applicable via lamination to a given corrective lens.

In particular, the present invention pertains to a method to incorporate plano, flat, or curved wafers comprising laminated films that contain optical microstructures (e.g. microscale features) into the bulk or onto the surface of an optical lens (e.g., plano or powered) that is devoid of optical microstructures. In this way, the intensive design and fabrication process associated with generating unique architectures and arrangements for different lens substrate materials can be avoided in favor or more generally applicable approach.

In an embodiment, the curved wafer, or laminate, can be a single design and material that can be used with several optical lens substrate materials. As introduced above, this approach circumvents the need for using different optical microstructure designs with different optical lens substrate materials.

In an embodiment, the optical microstructure design may be a protrusion from a surface of a film of the wafer. The optical microstructure design may be a microlens, for instance, and may have an appearance of concentric circles or other organized arrangement of patterns on the lens surface. The design of the microlens array that provides the concentric circles or other surface pattern appearance may be fixed relative to other components of the wafer. For instance, the design of the microlens may be fixed with consideration to the difference between a refractive index of the microlens material and a refractive index of a neighboring medium (e.g., a coating, an adhesive, a conformational film, etc.).

Turning now to the Figures, the above-introduced design of each optical microstructure of an array of optical microstructures allows for application of a wafer, or a laminate, of the present disclosure to a variety of optical lens substrates. This approach is an improvement over present technology, described in FIG. 1, wherein an optical lens 101 may be directly modified through engraving, etching, embossing, coating, or other approach to provide optical microstructures 105 directly on a surface of the optical lens 101. As described, direct modification of a surface of the optical lens 101 may lead to poor visual acuity as a result of, for instance, scratching of the optical microstructures 105 disposed thereon. Accordingly, the present disclosure describes a laminate, introduced in FIG. 2, allowing for wide use of a single architecture and arrangement of optical microstructures to accommodate a variety of optical lens substrates.

Figure 2:
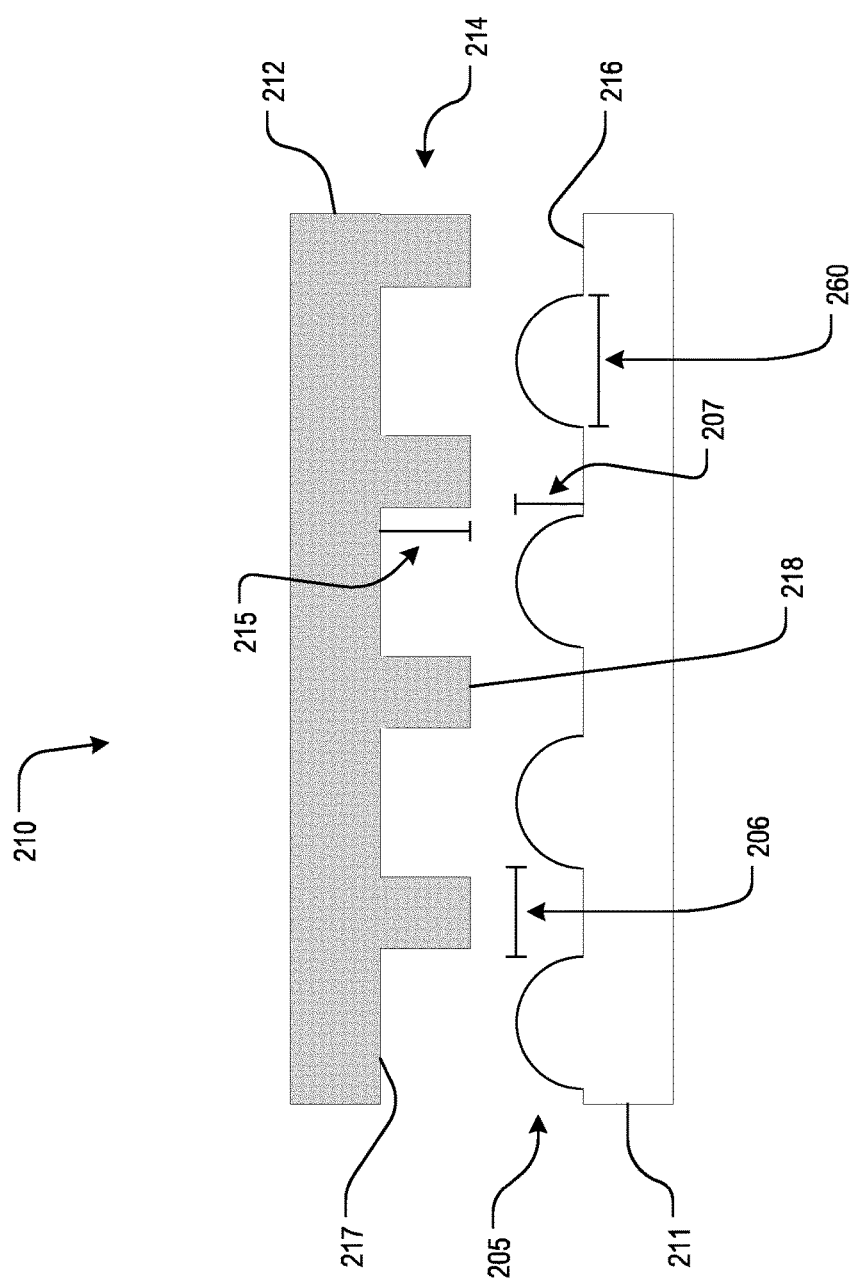
FIG. 2 is an illustration of a laminate including optical microstructures, according to an exemplary embodiment of the present disclosure.

With reference to FIG. 2, a cross-sectional schematic of a laminate 210 before lamination, a first film 211 and a second film 212 of the laminate 210 are provided. The first film 211 may be a first material having a first refractive index. In an example, the first film 211 may be, as the first material, cellulose triacetate (TAC), poly(methyl methacrylate) (PMMA), or polycarbonate (PC), wherein the first material has a refractive index of approximately 1.48, 1.5, or 1.59 for the material thereof. The first film 211 may include, disposed on a first surface 216 of the first film 211, one or more optical microstructures 205. Each of the one or more optical microstructures 205 may have a dimensional height 207, a dimensional width 260, and may be separated from an adjacent one of the one or more optical microstructures 205 by a predetermined distance 206 that defines an area between the one or more optical microstructures 205. Presented as having a hemispherical shape in FIG. 2, each of the one or more optical microstructures 205 may have a variety of shapes including hemispherical, rectangular, cylindrical, pyramidal, circular, elliptical, triangular, and prismatic, among others, as demanded by a visual requirement. It can be appreciated that the first film 211, having on the first surface 216 thereof the one or more optical microstructures 205, provides the concentric circles or other surface pattern appearance. The second film 212 of the laminate 210 may be a second material having a second refractive index. In an example, the second material of the second film 212 may have the same, lower, or higher refractive index. Accordingly, the second refractive index may be, for instance, 1.4, 1.5 or 1.74. It can be appreciated that the use of the phrases "lower refractive index" and "higher refractive index" reflect relative terms between the first material of the first film 211 and the second material of the second film 212. The second film 212 may include, disposed on a first surface 217 of the second film 212, one or more structures 214. The one or more structures 214 may have a dimensional height 215 and may be separated by a distance such that a contacting surface 218 is aligned with a corresponding area of the first film 211 defined by the predetermined distance 206 between adjacent ones of the one or more optical microstructures 205. Presented as having a rectangular shape in FIG. 2, each of the one or more structures 214 may have a variety of shapes including hemispherical, rectangular, cylindrical, pyramidal, circular, elliptical, prismatic, and triangular, among others, as dictated by the shape of the area defined by the predetermined distance 206 between adjacent ones of the one or more optical microstructures 205.

According to an embodiment, each of the one or more optical microstructures 205 may have a higher refractive index than a medium surrounding it. In other words, a difference in refractive indices may be positive.

According to an embodiment, the one or more optical microstructures 205 may be hemispherical and the dimensional width 260 may be a diameter. Given a fixed diameter, and assuming a difference between refractive indices of the one or more optical microstructures 205 and a surrounding medium is large (i.e., $\Delta=0.7$), the dimensional height 207 of the one or more optical microstructures 205 may be small. If, however, given a fixed diameter and assuming a difference between refractive indices of the one or more optical microstructures 205 and a surrounding medium is small (i.e., $\Delta=0.2$), the dimensional height 207 of the one or more optical microstructures 205 may be large.

In an example, if the difference between refractive indices of the one or more optical microstructures 205 and a surrounding medium is negative, concavity of the one or more optical microstructures 205 must change (e.g. be inverted) to ensure the same power result. In an embodiment, the curvature design depends on the desired target functionality of the one or more optical microstructures 205. If the desired target functionality is prevention of myopia progression, a positive difference in refractive indices is preferred. It can be appreciated that, given a surrounding medium refractive index of 1.0, a refractive index of the one or more optical microstructures 205 may be 1.74, thereby producing a minimal dimensional height 207.

Figure 3A:
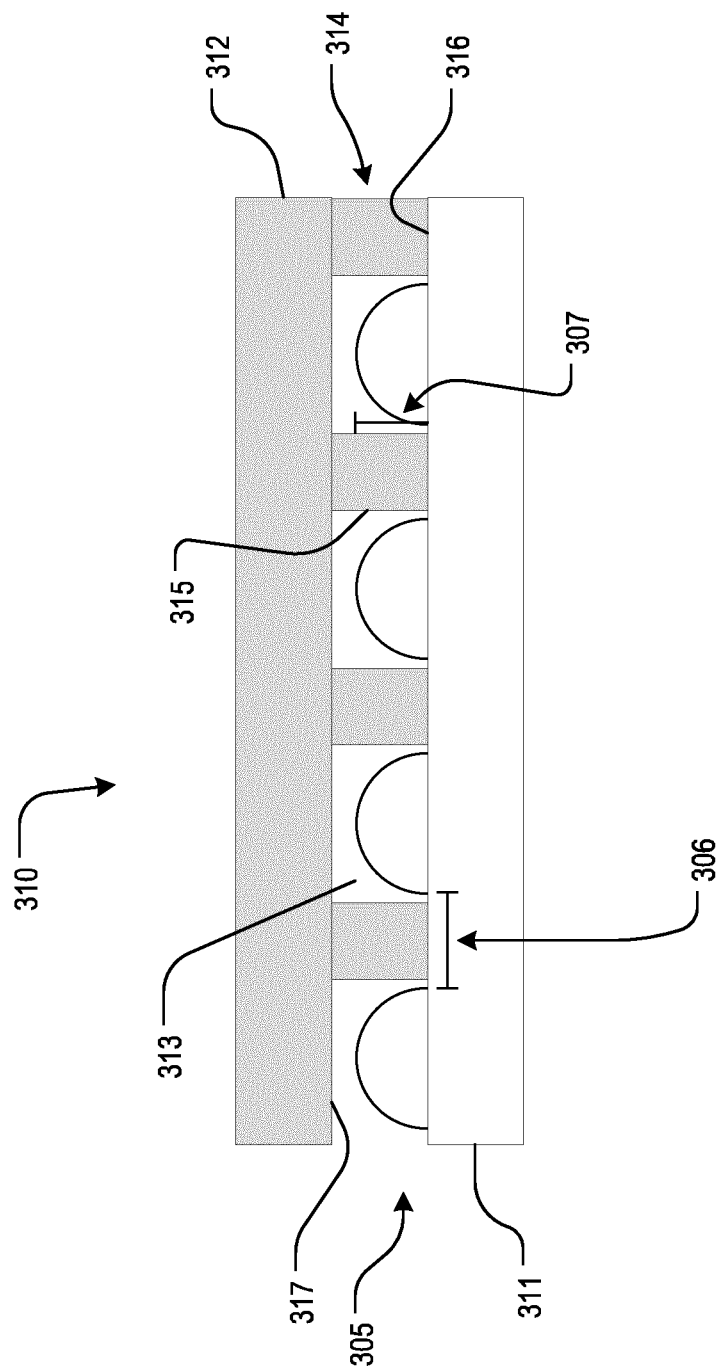
FIG. 3A is an illustration of a laminate including optical microstructures, according to an exemplary embodiment of the present disclosure.
Figure 3B:
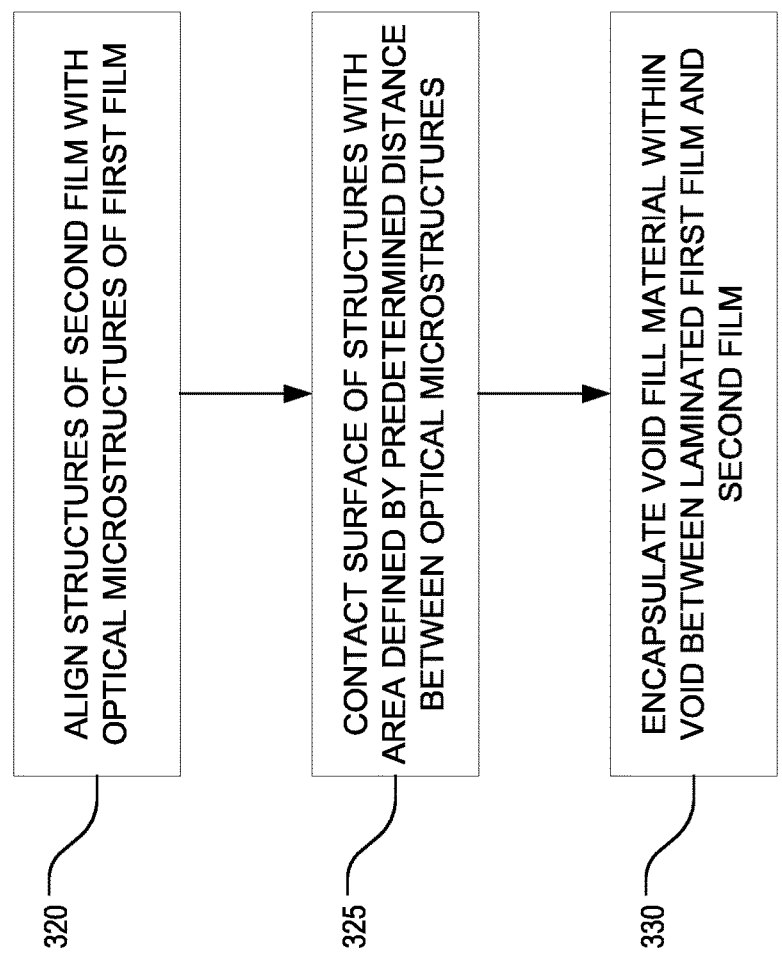
FIG. 3B is a flow diagram of a method of preparing a laminate including optical microstructures, according to an exemplary embodiment of the present disclosure.

In an embodiment, with reference to FIG. 3A and FIG. 3B, a laminate 310 similar to that of FIG. 2 may comprise a first film 311 and a second film 312. During lamination, one or more structures 314 disposed on a second surface 317 of the second film 312 may be aligned, at step 320 of method 300, and brought into contact with areas of a first surface 316 of the first film 311 defined by a predetermined distance 306 between one or more optical microstructures 305 disposed on the first surface 316 of the first film 311, at step 325 of method 300. Lamination can be achieved by a roll-to-roll process, among others. As can be appreciated from FIG. 3A, the laminate 310 may be designed such that a magnitude of a dimensional height 315 of the one or more structures 314 is greater than a magnitude of a dimensional height 307 of each of the one or more optical microstructures 305. In this way, at least one void remains between the first film 311 and the second film 312 upon lamination. Following lamination, a void fill material 313 may be encapsulated, forming a surrounding medium, within at least a portion of the at least one void at step 330 of method 300. The void fill material 313 may be a material having a predetermined refractive index. In an example, the void fill material 313 may be a gel, a solid, a fluid such as a liquid or a gas, or a combination thereof. The gas may be an impermeable gas and/or may be air, nitrogen, argon, xenon, and the like. The predetermined refractive index of the void fill material 313 may be 1.0.

According to an embodiment, the laminate 310 of FIG. 3 may be incorporated onto a convex surface of a thermoplastic or thermoset optical lens, by methods such as front-side lamination (e.g. laminating a wafer on a convex surface of the lens), to produce an optical lens having optical microstructures on the convex side.

Figure 4A:
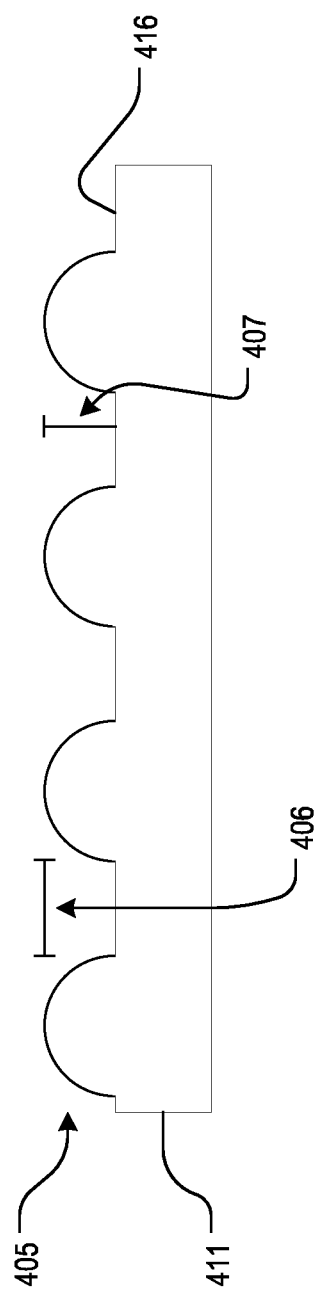
FIG. 4A is an illustration of a first film of a laminate including optical microstructures, according to an exemplary embodiment of the present disclosure.

Referring now to FIG. 4A, a first film 411 may be a first material having a first refractive index. The first film 411 may have a one or more optical microstructures 405 disposed on a first surface 416 of the first film 411. Each of the one or more optical microstructures 405 may have a dimensional height 407 and be separated from an adjacent one of the one or more optical microstructures 405 by a predetermined distance 406.

According to an embodiment, the one or more optical microstructures 405 may be disposed on the first surface 416 of the first film 411 by one of a plurality of methods. In one instance, a nickel-platinum plated-shim or nickel-silicon plated-shim may be used to emboss a given optical microstructure architecture and design on the first surface 416 of the first film 411. The nickel-platinum plated-shims and/or nickel-silicon plated-shims may include an array of the one or more optical microstructures to be embossed. The first film 411 may be heated to a temperature above a glass transition temperature (Ta) of the first material. In another instance, a stamp may be imprinted into the first surface 416 of the first film 411 to dispose the one or more optical microstructures 405 thereon. The imprinting may be aided by an ultraviolet process, wherein a thin-coated layer of ultraviolet-curable material is applied to the first surface 416 of the first film 411 and is then cured by ultraviolet light to solidify a pattern of the one or more optical microstructures 405 on the first surface 416 of the first film 411.

Figure 4B:
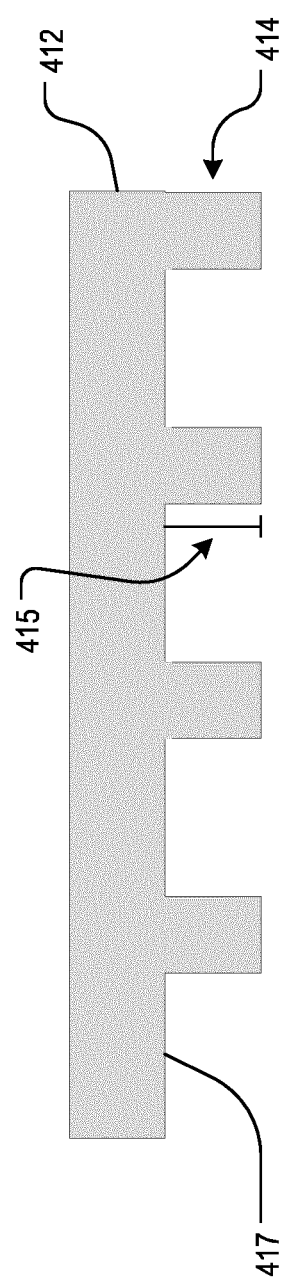
FIG. 4B is an illustration of a second film of a laminate including optical microstructures, according to an exemplary embodiment of the present disclosure.

Referring now to FIG. 4B, a second film 412 may be a second material having a second refractive index. The second film 412 may have a one or more structures 414 disposed on a first surface 417 of the second film 412. Each of the one or more structures 414 may have a dimensional height 415 and be separated from an adjacent one of the one or more structures 415 by a predetermined distance corresponding to a predetermined distance between one or more optical microstructures of a first film of a laminate. This allows the one or more structures 415 to occupy at least a portion of a space not covered by the one or more optical microstructures of the first film. This may be referred to as 'anti-microlens coverage' of an 'interstitial space'. The one or more structures 414 of the second film 412 may be flatter, smaller or larger, and occupy more or less space than the one or more optical microstructures of the first film.

According to an embodiment, the one or more structures 414 may be disposed on the first surface 417 of the second film 412 by one of a plurality of methods, described above with reference to FIG. 4A. In one instance, a nickel-platinum plated-shim or nickel-silicon plated-shim may be used to emboss a given architecture and design on the first surface 417 of the second film 412. The nickel-platinum plated-shims and/or nickel-silicon plated-shims may include an array of the one or more structures to be embossed. The second film 412 may be heated to a temperature above a glass transition temperature (Ta) of the second material. In another instance, a stamp may be imprinted into the first surface 417 of the second film 412 to dispose the one or more structures 414 thereon. The imprinting may be aided by an ultraviolet process, wherein a thin-coated layer of ultraviolet-curable material is applied to the first surface 417 of the second film 412 and is then cured by ultraviolet light to solidify a pattern of the one or more structures 414 on the first surface 417 of the second film 412.

Figure 5:
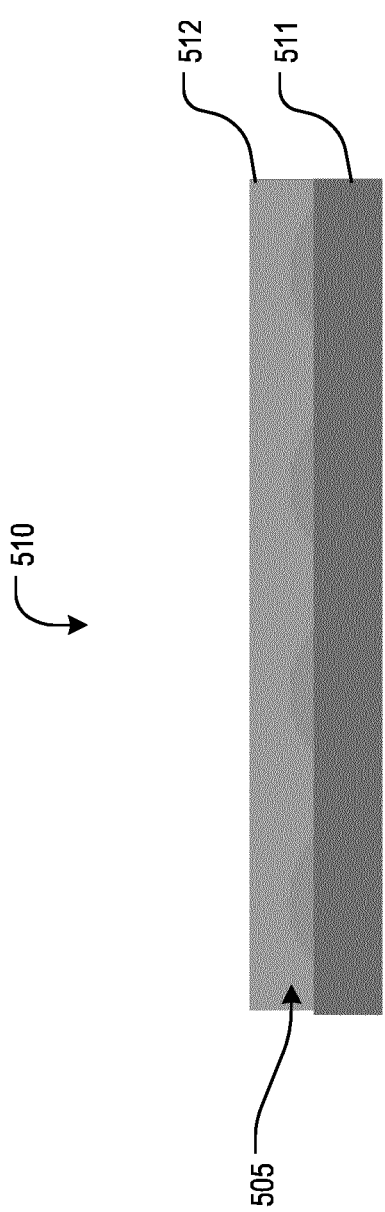
FIG. 5 is an illustration of a first film of a laminate including optical microstructures, according to an exemplary embodiment of the present disclosure.

According to an embodiment, and in view of the above, a first film 511 and a second film 512 of a laminate 510, as in FIG. 5, may be laminated such that a void fill material is not encapsulated within at least a portion of at least one void between one or more optical microstructures 505 of the first film 511 and the second film 512. The first film 511 may be a first material having a first refractive index. The second film 512 may be a second material having a second refractive index. As described above, the second refractive index may be different from the first refractive index.

In an embodiment, the first film 511 of the laminate 510 of FIG. 5 may be fabricated according to one of a variety of methods described with respect to the above-described first film 411 of FIG. 4A. The second film 512 may be deposited on the first film 511 including one or more optical microstructures 505 by means of material deposition on a first surface of the first film 511. Examples of deposition processes may include chemical vapor deposition, physical vapor deposition, inkjetting, dry or wet spray coating, electric or magnetic field assisted plating digital printing, and the like and may be followed by a densification process involving the application of heat and pressure. Such heat and pressure may be applied by an autoclave, between heated nipped rollers, in a flat plate stamp, and the like. Alternatively, a first surface, or contacting side, of the second film 512 may be heated to above its softening temperature by means of an infrared lamp, hot air, or convection, and brought into contact with the first surface of the first film 511 in a pressing process. The pressing process may include nipped rollers, a flat plate stamp, vacuum forming, or the like.

In an embodiment, a coating can be applied via a slot die coater to encapsulate one or more optical microstructures on a first film. The coating may be a thick coating and may be water-based, solvent-based, or solvent-less. The coating may be applied as a first coating type and a second coating type, wherein a volatile carrier (e.g., water, solvent) evaporate, leaving coating solids as a residue. A third coating type may be used to cure the coating. The third coating type may be one of thermal, ultraviolet, E-beam, and the like. The third coating type may be a third material having a third refractive index. The third material may be MR-8, having a refractive index of ~1.60, MR-10, having a refractive index of ~1.67, or any other plastic having a refractive index of between ~1.70 and ~1.74.

The above describe coatings, and similar coatings, may be applied using slot die, curtain, doctor blade or other thick film coating method to encapsulate the one or more optical microstructures. This application may be aided by use of a self-leveling coating material on top of the one or more optical microstructures of the first film to create the second film. The coating may be a solvent-less coating using energy-assisted curing, may be one of thermal, ultraviolet, E-beam, and the like, or may be solvent-based (e.g., water-based or VOC solvent-based) and dried and densified in a convection, conduction, or infrared oven.

In another embodiment, a second film of a laminate may be brought into contact with a first film of the laminate, the first film having one or more optical microstructures on a first surface thereof, and laminated by application of an adhesive. The adhesive may be a water-based adhesive, solvent-based adhesive, or solvent-less adhesive, as appropriate.

In another embodiment, in view of FIG. 5, a second film of a laminate may be brought into contact with a first film of the laminate by extrusion lamination. The first film of the laminate may include one or more optical microstructures. During extrusion lamination, the second film may be a hot extruded film and may be brought into contact with the first film via nip roller.

Figure 6A:
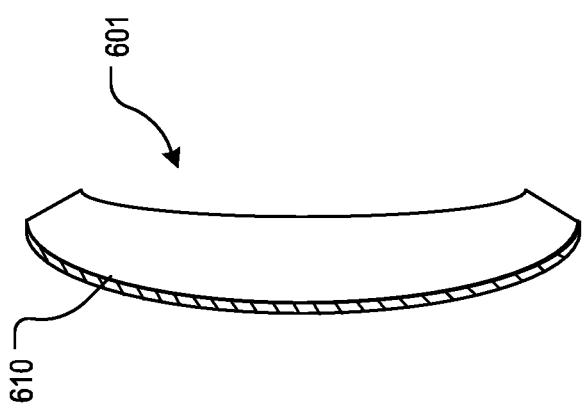
FIG. 6A is an illustration of a lens having a laminate including optical microstructures laminated thereto, according to an exemplary embodiment of the present disclosure.
Figure 6B:
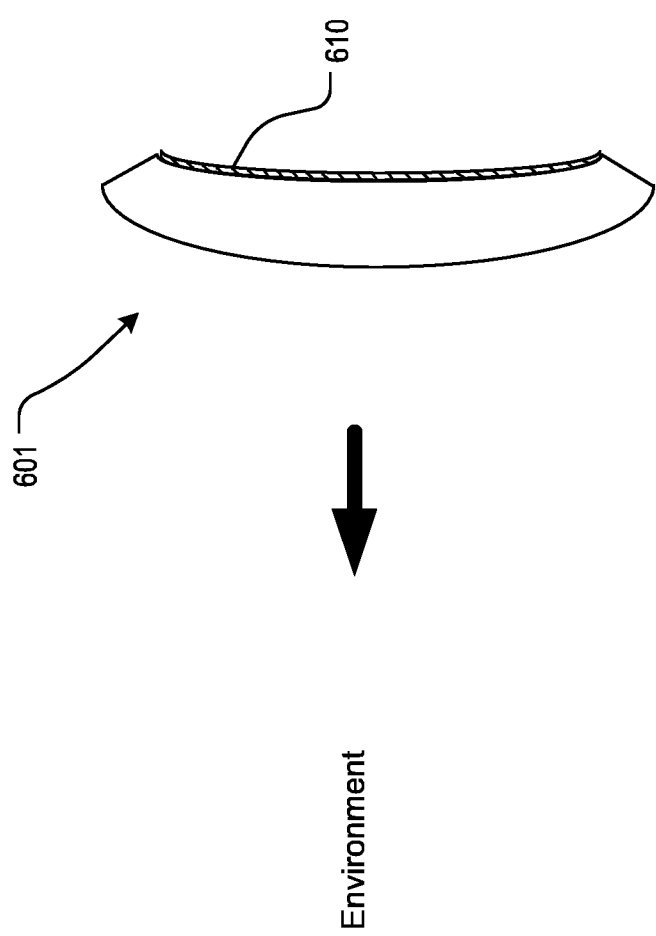
FIG. 6B is an illustration of a lens having a laminate including optical microstructures laminated thereto, according to an exemplary embodiment of the present disclosure.

With reference now to FIG. 6A and FIG. 6B, any one of the above-described laminates, as a non-limiting group, may be cut, formed into curved wafers, and incorporated into an optical lens 601. The incorporation of a laminate 610, including optical microstructures, may be performed by, among other techniques, injection overmolding, wafer casting (i.e., on-surface or in-lens), or pressure and/or heat assisted "front-side lamination" and/or "back-side lamination" onto existing semi-finished and/or finished lenses. Any one of the above-identified techniques may require one or both surfaces of the laminate to contain, or be coated with, a primer layer or adhesive layer (e.g., pressure-sensitive adhesive, hot-melt adhesive) to facilitate adhesion to the lens substrate material. As in FIG. 6A, a laminate 610 may be adhered to a convex surface of an optical lens 601, thus arranging the laminate 610 opposite a surface of the optical lens 601 adjacent an eye of an eyeglass wearer. As in FIG. 6B, a laminate 610 may be adhered to a concave surface of an optical lens 601, thus arranging the laminate 610 on a surface of the optical lens 601 adjacent an eye of an eyeglass wearer. The optical lens 610 may be an existing thermoplastic or thermoset optical lens.

Figure 7A:
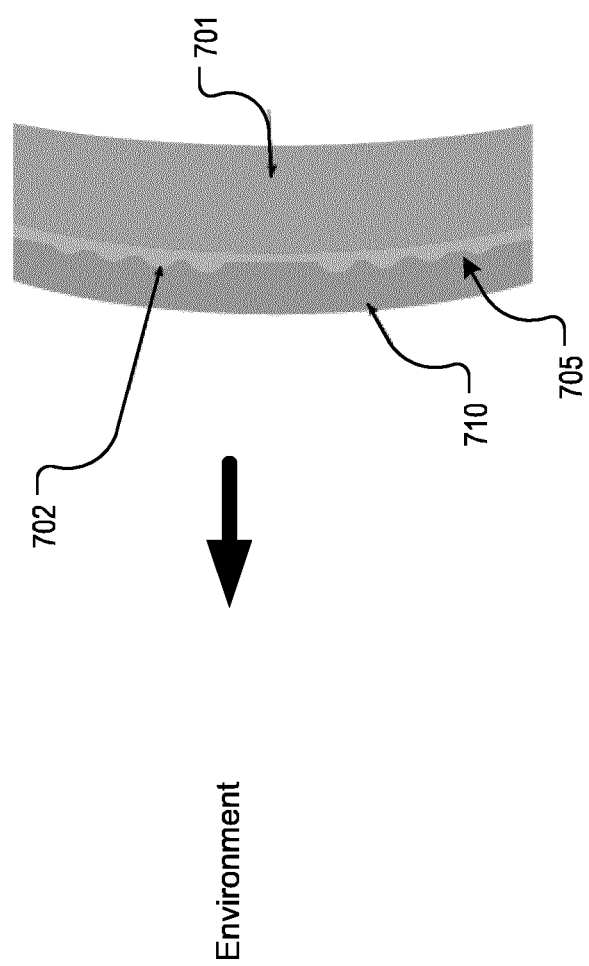
FIG. 7A is an illustration of a lens having a laminate including optical microstructures laminated thereto via adhesive, according to an exemplary embodiment of the present disclosure.
Figure 7B:
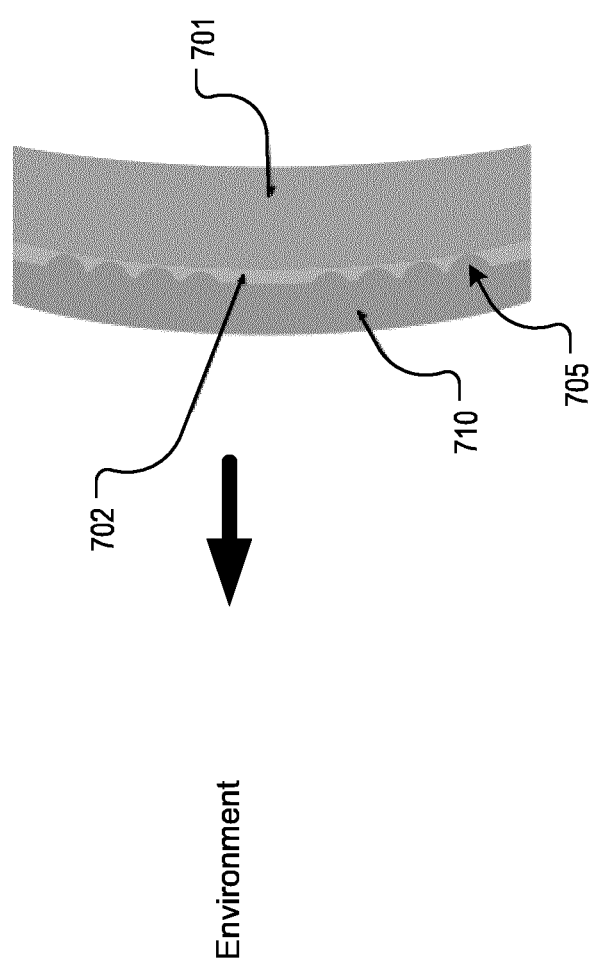
FIG. 7B is an illustration of a lens having a laminate including optical microstructures laminated thereto via adhesive, according to an exemplary embodiment of the present disclosure.

According to an embodiment, and with reference to FIG. 7A and FIG. 7B, a laminate, or wafer 710, including one or more optical microstructures 705 and having refractive index $RI_{wafer}$, may be prepared according to a concave surface of an optical lens 701 and then laminated onto a convex surface of the optical lens 701. The optical lens 701 may have refractive index $RI_{lens}$. The one or more optical microstructures may be microlenses and, in particular, microlenses of the Fresnel-lens type. The lamination may be facilitated by use of an adhesive 702 of refractive index $RI_{adh}$. The adhesive 702 may be a water-based adhesive, solvent-based adhesive, or solvent-less adhesive, as appropriate. Of course, as an alternative, a laminate 710 may be prepared according to a convex surface of an optical lens 701 and then laminated onto the concave surface of the optical lens 701, as desired.

In an embodiment, the resulting diopter powers of the one or more optical microstructures is dependent upon $\Delta RI = (RI_{wafer} - RI_{adh})$ and is independent of $RI_{lens}$, assuming that $RI_{wafer} \neq RI_{adh}$. In this way, it can be appreciated that substrate material is immaterial to the function of the laminate when the laminate and the adhesive are carefully selected.

According to an embodiment, the laminate may be produced by, in addition to the methods described above, injection molding. The lamination step can be performed during injection molding of an optical thermoplastic lens by an in-mold lamination process, thus making the process scalable for mass production. Additionally, the lamination may be carried out in a prescribing lab by "front-side lamination" or "back-side lamination" based upon the desired result.

In other words, a variety of fabrication options exist. In at least one option, a laminate, as described above, may be positioned within a mold prior to forming an optical lens. In at least one option, a laminate can be adhered and/or bonded to an already formed optical lens. For instance, in order to form thermoplastic polycarbonate (PC) lenses, a laminate can be overmolded on a convex surface of the lens. In other words, a molten PC may be injected behind the laminate. In another instance, for thermoset cast lenses, a laminate can be positioned on a surface of a casting mold or the laminate may be offset from the surface of the casting mold by 0.1 mm to 1.0 mm. In this way, at least a portion of at least one void therebetween may be filled with thermoset monomers/resin and allowed to cure. A primer layer may be required to allow a surface of the laminate to bond to the thermoset monomers/resin.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A laminate, comprising a first film, of a first material having a first refractive index, including a pattern of microstructures embossed on a first surface of the first film, each microstructure of the embossed pattern of microstructures being an optical microstructure arranged at a predetermined distance between adjacent optical microstructures, and a second film, of a second material having a second refractive index, including structures arranged on a first surface of the second film at positions corresponding to areas of the first surface of the first film defined by the predetermined distance between adjacent optical microstructures, wherein when the second film is laminated to the first film, the structures arranged on the first surface of the second film are in contact with the areas of the first surface of the first film defined by the predetermined distance between adjacent optical microstructures, a height of the structures of the second film is greater than a height of each optical microstructure, and a delta between the height of the structures of the second film and the height of each optical microstructure encapsulates, upon the lamination of the second film to the first film, a void fill material within at least a portion of at least one void defined by the delta, the void fill material having a predetermined refractive index.

(2) The laminate according to (1), wherein the laminate is laminated on a convex surface of a lens, the convex surface of the lens being opposite a surface of the lens adjacent an eye of a lens wearer, a second surface of the first film being in contact with the convex surface of the lens.

(3) The laminate according to either (1) or (2), wherein the laminate is laminated on a convex surface of a lens, the convex surface of the lens being opposite a surface of the lens adjacent an eye of a lens wearer, a second surface of the second film being in contact with the convex surface of the lens.

(4) The laminate according to any one of (1) to (3), wherein the first refractive index of the first material is different from the predetermined refractive index of the void fill material.

(5) The laminate according to any one of (1) to (4), wherein the first refractive index of the first material is greater than 1.4.

(6) The laminate according to any one of (1) to (5), wherein the first material of the first film and the second material of the second film are a same thermoplastic.

(7) The laminate according to any one of (1) to (6), wherein the void fill material is an impermeable gas.

(8) A method of generating a laminate, comprising laminating a first film of the laminate, the first film being a first material having a first refractive index, to a second film of the laminate, the second film being a second material having a second refractive index, by contacting structures arranged on a first surface of the second film with areas of a first surface of the first film defined by a predetermined distance between adjacent optical microstructures, wherein each optical microstructure is a microstructure of a pattern of microstructures embossed on the first surface of the first film and arranged at the predetermined distance between adjacent optical microstructures, the structures on the first surface of the second film are arranged to correspond with the areas of the first surface of the first film defined by the predetermined distance between adjacent optical microstructures, a height of the structures on the first surface of the second film is greater than a height of each optical microstructure embossed on the first surface of the first film, and a delta between the height of the structures on the first surface of the second film and the height of each optical microstructure embossed on the first surface of the first film encapsulates, upon the laminating of the first film and the second film, a void fill material within at least a portion of at least one void defined by the delta, the void fill material having a predetermined refractive index.

(9) The method according to (8), further comprising laminating the laminate on a convex surface of a lens, the convex surface of the lens being opposite a surface of the lens adjacent an eye of a lens wearer, a second surface of the first film being in contact with the convex surface of the lens.

(10) The method according to either (8) or (9), further comprising laminating the laminate on a convex surface of a lens, the convex surface of the lens being opposite a surface of the lens adjacent an eye of a lens wearer, a second surface of the second film being in contact with the concave surface of the lens.

(11) The method according to any one of (8) to (10), wherein the laminating includes applying an adhesive to a contacting surface of the structures arranged on the first surface of the second film and to the areas of the first surface of the first film defined by the predetermined distance between adjacent optical microstructures.

(12) The method according to any one of (8) to (11), wherein the first refractive index of the first material is different from the predetermined refractive index of the void fill material.

(13) The method according to any one of (8) to (12), wherein the first refractive index of the first material is greater than 1.4.

(14) The method according to any one of (8) to (13), wherein the first material of the first film and the second material of the second film are a same thermoplastic.

(15) The method according to any one of (8) to (14), wherein the void fill material is an impermeable gas.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A laminate configured to be laminated onto a surface of an optical lens or incorporated into a bulk lens, comprising:
a first film, of a first material having a first refractive index, including a pattern of microstructures embossed on a first surface of the first film, each microstructure of the embossed pattern of microstructures being an optical microstructure arranged at a predetermined distance between adjacent optical microstructures; and
a second film, of a second material having a second refractive index, including structures arranged on a first surface of the second film at positions corresponding to areas of the first surface of the first film defined by the predetermined distance between adjacent optical microstructures, wherein
when the second film is laminated to the first film, the structures arranged on the first surface of the second film are in contact with the areas of the first surface of the first film defined by the predetermined distance between adjacent optical microstructures,
a height of the structures of the second film is greater than a height of each optical microstructure, and
a delta between the height of the structures of the second film and the height of each optical microstructure encapsulates, upon the lamination of the second film to the first film, a void fill material within at least a portion of at least one void defined by the delta, the void fill material having a predetermined refractive index,
wherein the first refractive index of the first material is different from the second refractive index of the second material.

2. The laminate according to claim 1, wherein the laminate is laminated on the surface of the optical lens which is a convex surface, said convex surface of the lens being opposite a surface of the lens adjacent an eye of a lens wearer, a second surface of the first film being in contact with the convex surface of the lens.

3. The laminate according to claim 1, wherein the laminate is laminated on the surface of the optical lens which is a convex surface, said convex surface of the lens being opposite a surface of the lens adjacent an eye of a lens wearer, a second surface of the second film being in contact with the convex surface of the lens.

4. The laminate according to claim 1, wherein the first refractive index of the first material is different from the predetermined refractive index of the void fill material.

5. The laminate according to claim 1, wherein the first refractive index of the first material is greater than 1.4.

6. The laminate according to claim 1, wherein the void fill material is a gas including at least air, nitrogen, argon or xenon.

7. A method of generating a laminate configured to be laminated onto a surface of an optical lens or incorporated into a bulk lens, comprising:

laminating a first film of the laminate, the first film being a first material having a first refractive index, to a second film of the laminate, the second film being a second material having a second refractive index, by contacting structures arranged on a first surface of the second film with areas of a first surface of the first film defined by a predetermined distance between adjacent optical microstructures, wherein
each optical microstructure is a microstructure of a pattern of microstructures embossed on the first surface of the first film and arranged at the predetermined distance between adjacent optical microstructures,
the structures on the first surface of the second film are arranged to correspond with the areas of the first surface of the first film defined by the predetermined distance between adjacent optical microstructures,
a height of the structures on the first surface of the second film is greater than a height of each optical microstructure embossed on the first surface of the first film, and
a delta between the height of the structures on the first surface of the second film and the height of each optical microstructure embossed on the first surface of the first film encapsulates, upon the laminating of the first film and the second film, a void fill material within at least a portion of at least one void defined by the delta, the void fill material having a predetermined refractive index,
wherein the first refractive index of the first material is different from the second refractive index of the second material.

8. The method according to claim 7, further comprising laminating the laminate on the surface of the optical lens which is a convex surface, said convex surface of the lens being opposite a surface of the lens adjacent an eye of a lens wearer, a second surface of the first film being in contact with the convex surface of the lens.

9. The method according to claim 7, further comprising laminating the laminate on the surface of the optical lens which is a convex surface, said convex surface of the lens being opposite a surface of the lens adjacent an eye of a lens wearer, a second surface of the second film being in contact with the concave surface of the lens.

10. The method according to claim 7, wherein the laminating includes applying an adhesive to a contacting surface of the structures arranged on the first surface of the second film and to the areas of the first surface of the first film defined by the predetermined distance between adjacent optical microstructures.

11. The method according to claim 7, wherein the first refractive index of the first material is different from the predetermined refractive index of the void fill material.

12. The method according to claim 7, wherein the first refractive index of the first material is greater than 1.4.

13. The method according to claim 7, wherein the void fill material is a gas including at least air, nitrogen, argon or xenon.

* * * * *